Feb. 15, 1955  S. KRASNOW ET AL  2,702,352
RADIOACTIVITY DETECTING APPARATUS FOR USE IN BOREHOLES
Original Filed Oct. 1, 1941  3 Sheets-Sheet 1

INVENTORS.
SHELLEY KRASNOW
MEYER JOSEPH TEST
BY
Campbell, Brumbaugh, Free & Graves
THEIR ATTORNEYS.

INVENTORS.
SHELLEY KRASNOW
MEYER JOSEPH TEST
BY
Campbell, Brumbaugh, Free & Graves
THEIR ATTORNEYS.

United States Patent Office 2,702,352
Patented Feb. 15, 1955

2,702,352

RADIOACTIVITY DETECTING APPARATUS FOR USE IN BOREHOLES

Shelley Krasnow, Fairfax, Va., and Meyer Joseph Test, Kansas City, Mo., assignors to Schlumberger Well Surveying Corporation, Houston, Tex., a corporation of Delaware Original application October 1, 1941, Serial No. 413,240. Divided and application May 19, 1948, Serial No. 27,857, now Patent No. 2,640,161, dated May 26, 1953. Again divided and this application January 30, 1951, Serial No. 208,610

6 Claims. (Cl. 250—83.6)

This invention relates to apparatus for measuring radioactivity in bore holes. This subject has been taught in considerable detail in the earlier work of one of the co-inventors. The present apparatus is intended to provide improved means for the expeditious and accurate measurement of radioactivity in deep bore holes.

This application is a division of our parent application Serial No. 413,240, filed October 1, 1941, for "Borehole Radioactive Apparatus," now abandoned, of which a division having the same disclosure, Serial No. 27,857, filed May 19, 1948, for "Energizing Systems for Borehole Radioactivity Apparatus" matured on May 26, 1953, as U. S. Patent No. 2,640,161.

It is an object of the invention to provide a convenient radioactive bore hole apparatus, capable of making measurements of radioactivity at a desired depth in a bore hole.

It is a further object of the invention to provide such an apparatus which will record continuously the radioactivity measured at different depths.

It is a further object of the invention to provide an apparatus which will record faithfully and will integrate pulses from a counter device operated in the bore hole.

It is a further object of the invention to obtain a heightened result in the measurement of radioactivity.

It is a further object of the invention to provide a compact counter element and associated circuit which may be contained within a narrow cartridge capable of being lowered into a bore hole.

It is a further object of the invention to provide radioactive bore hole apparatus which may be easily assembled and disassembled, and which is protected from mechanical shocks when in use.

It is a further object of the invention to provide a radioactive bore hole apparatus which does not require a primary voltage source within the cartridge.

It is a further object of the invention to provide an improved system for amplifying and transmitting pulses produced by a radioactive measuring system utilized in a bore hole.

Other objects and advantages of the invention will be apparent from the following drawings, in which.

Figure 2:
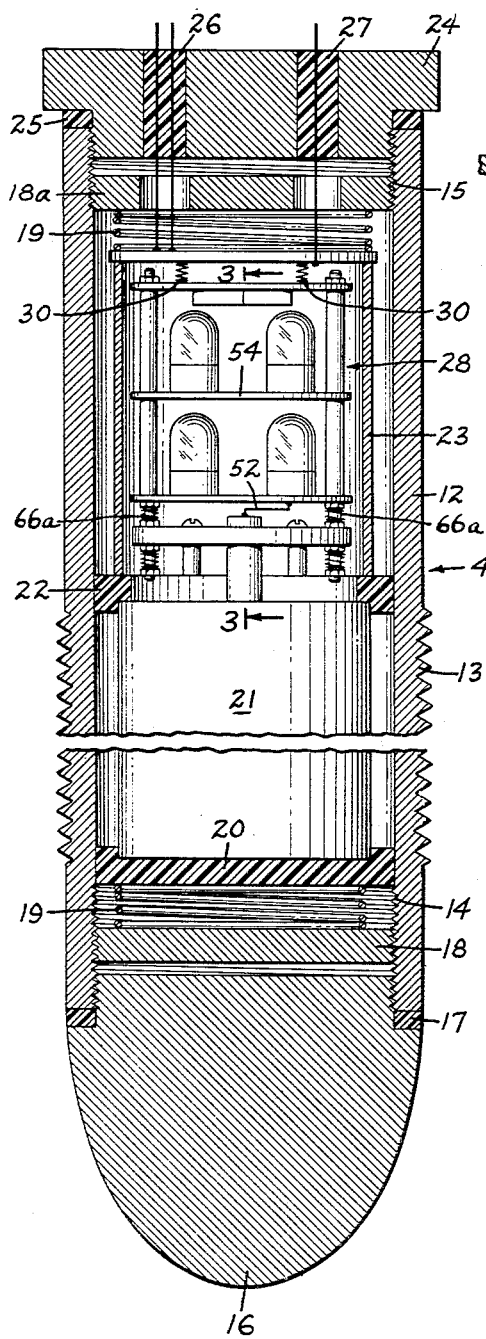
Fig. 2 represents a longitudinal cross-sectional view of the cartridge shown in Fig. 1, showing the relative arrangement of the elements.
Figure 1:
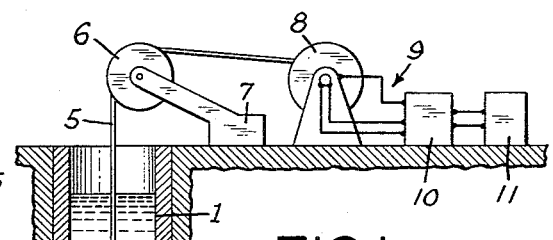
Fig. 1 represents a schematic view of the apparatus as used in a bore hole.

1 represents a bore hole drilled in the earth in which may or may not exist a metallic casing 2. The bore hole may or may not be filled with liquid 3. Suspended within the bore hole is an element 4, serving to contain certain of the elements of the apparatus and to place these elements proximate to the strata from which it is desired to obtain indications. Suspending the element 4 is a multi-conductor cable 5, which serves to position the element 4, to conduct energy into the said element and also to receive responses therefrom. The cable 5 passes over a measuring wheel 6, which at all times indicates the depth of the element 4, and which may be connected to other portions of the apparatus to record the depth against any other desired quantity. The wheel 6 rests upon a support 7 at the top of the bore hole. Cable 5 may be reeled or unreeled by means of a drum 8, which has slip rings allowing connection to be made during rotation and for any position of the drum to a number of stationary wires 9. These wires lead to apparatus 10 and 11, whose purpose will be hereinafter described.

Referring now particularly to Fig. 2, 12 represents the exterior of the cartridge 4. This is preferably made of a strong metal such as high strength steel, and may be provided with a corrugated exterior surface 13 where the rays are to pass through. At either end of the member 12 internally threaded portions 14 and 15 are provided into which suitable supports and closures may be fastened. At the lower end of the cartridge is a closure 16 which may be screwed into the tube 12 and which bears against a gasket represented schematically as 17 to shield the apparatus against high hydrostatic pressures. Above the upper portion of the element 16 is a threaded insert 18 which serves as a mechanical support. This bears against a coil spring 19, which in turn bears against an insulating block 20. Fastened rigidly to the insulating block 20 is a radioactive sensitive element 21 which may be of the type disclosed in our copending application Serial No. 27,856, filed May 19, 1948, for "Construction of Geiger-Müller Tube" which matured on July 29, 1952, as U. S. Patent No. 2,605,435. Insulating ring 22 is fastened rigidly to the upper end of the radioactive sensitive element, and a preferably metallic tube 23 rests upon the upper end of this insulator. An additional threaded insert 18a is placed above tube 23, and serves to compress a coil spring 19. This assemblage maintains the element 21 in a sort of floating support, held by springs above and below. The elements 20 and 22 will make light frictional contact against the walls of the tube 12, which will serve to damp mechanical oscillations. This may be aided by providing small springs which bear against the interior wall of the tube 12 and thus provide definite frictional contact. An upper closure 24 is provided which compresses a gasket 25 and serves to maintain the entire assemblage in fluid-tight and pressure-resistant condition. Wires lead through upper member 18a, through pressure-tight insulating bushings 26 and 27, respectively, and further to the surface of the earth. These wires are attached in mechanically strong fashion to element 24 so that they may be used to support the entire apparatus. Lying above insulating ring 22 is assemblage 28, containing the auxiliary elements and other portions required for operation. This is in the form of a relatively rigid frame upon which are mounted the vacuum tubes, condensers and resistors necessary for operation. The frame 28 rests upon springs 66a, which may be three in number and is also held downward by springs 30, which may also be three in number.

The assemblage 28 is preferably made in the form of a unitary structure which can be inserted into the cartridge 12 or removed conveniently at will.

Figure 6:
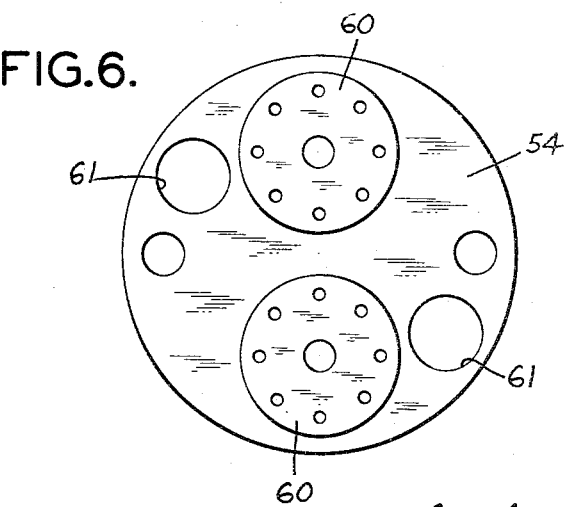
Fig. 6 shows a plan view of one of the sections shown in Fig. 3.

The assemblage 28 (Fig. 3) may be made of a number of plates such as 54, which are held in rigid spaced relation by means of rods 56, and separators 59. Nuts 58 serve to clamp the entire assemblage together. The number of rods 56 may be two, three, four, or more in number. Each of the elements 54 may be in the form of a disk of metal provided, for example, with vacuum tube sockets such as 60 (Fig. 6), and openings such as 61, through which wired connections may be taken from one level into another. Circuit elements such as condensers represented schematically as 57 (Fig. 3) may be fastened to a plate such as 53. The entire assemblage is wired together so that only the input and output wires extend below and above, respectively.

Figure 3:
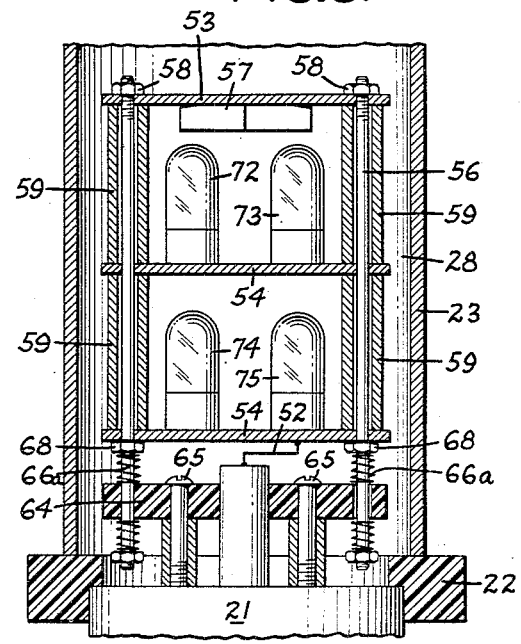
Fig. 3 shows a detail indicating the manner of mounting the circuit elements in the embodiment shown in Fig. 2.

A detail of the spring mounting of the assemblage 28 is shown in Fig. 3. Here threaded rods 56 pass through a disk 64, which is attached rigidly to the top of counter tube 21 by means of screws 65. At the lower end of each rod 56, a shoulder portion 68 is provided. Underneath this are springs 66a, which may be of coil form. Underneath disk 64 an additional set of springs is provided. Nuts are fastened at the lower portion of rod 56, thus providing a floating spring mounting for the entire assemblage 28.

It will be noted that the spring mountings for the counter tube 21 and the assemblage 28 are individual. The tube structures should preferably have different periods of oscillation so as to tend to suppress oscillations. It is understood that the unitary assemblage 28, may hold the elements of any desired circuit or auxiliary apparatus to operate the radioactive sensitive element, and to receive responses therefrom.

Figure 4:
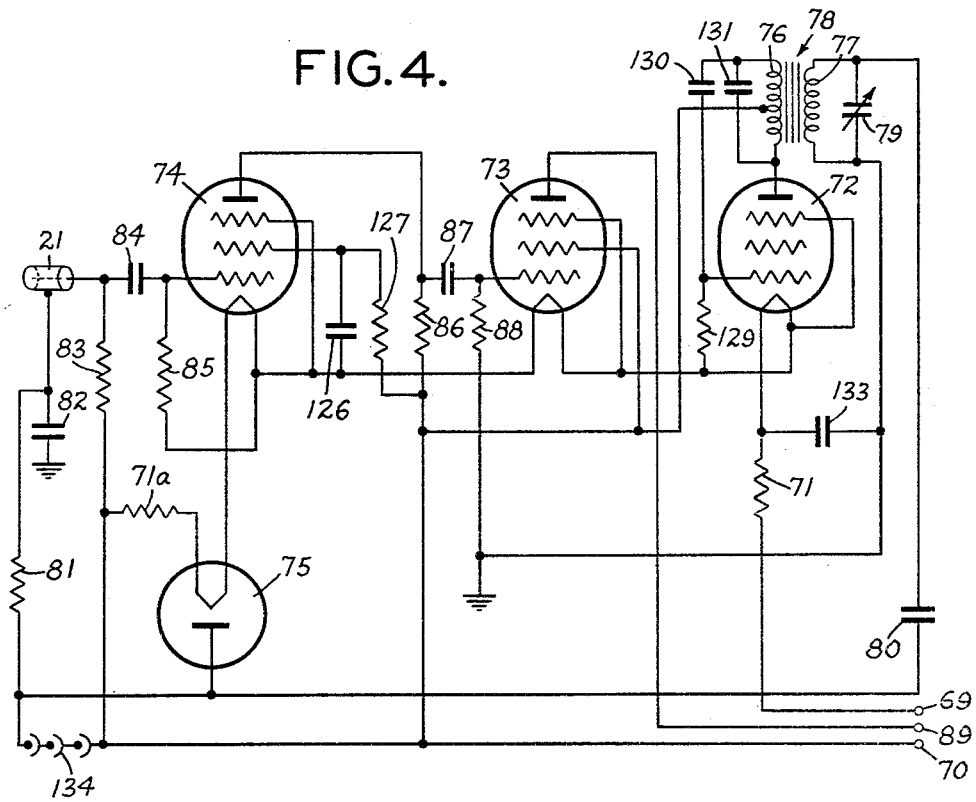
Fig. 4 shows the circuit diagram of the apparatus, indicating wiring of the parts within the cartridge.

Referring now particularly to Fig. 4, 69 and 70 represent the input power lead of the apparatus, 69 being a grounded negative lead, and 70 being a positive lead. The voltage between these two may be 220 or 250 volts or any other desired value. This voltage is applied to the filaments of the various vacuum tubes 72, 73, 74, and 75, through resistors 71 and 71a. This reduces the voltage to the proper value for all the filaments appearing. The voltage across resistor 71a is also applied to the plates of the various vacuum tubes as shown. An oscillatory circuit is provided comprised chiefly of vacuum tube 72, transformer 78, condenser 79, and condensers 130 and 131. This generates a high voltage by oscillation at a suitable frequency which may be 200 kilocycles. This voltage is applied across the rectifier tube 75, which furnishes a high direct current voltage through resistor 81 and across Geiger-Müller counter tube 21. Condenser 82 serves to improve the filtering of the direct current voltage furnished to the Geiger-Müller tube.

The pulses produced by the breakdown or discharge of the Geiger-Müller tube 21 are quenched by resistor 83. Such pulses are fed to condenser 84 and across resistor 85 placed between the filament and the grid of amplifier 74. Tube 74 and resistance-capacity coupled amplifier 73 both serve several functions. Tube 74 serves to amplify the pulses produced by the Geiger-Müller tube 21, and to invert these pulses. The original pulse is a negative one and is inverted to form a positive pulse. Tube 73 is operated as a class "C" amplifier so that the system will be unresponsive to microphonics. It also serves to sharpen the Geiger-Müller tube pulses. As shown, the system will respond only to appreciable pulses of the size produced by the Geiger-Müller tube. The final amplified pulse is then led through wire 89 to the surface of the ground. Condenser 79 serves to tune the secondary of the transformer 78 so as to obtain a desired frequency. The voltage output of the oscillator may be altered by detuning. This may be done by an automatically controlled condenser such as 79.

If desired, the resistor 129 may be made of sufficiently high value to cause the oscillator to block intermittently, thus decreasing plate current of 72. This will produce a transient oscillation or super-regenerative oscillation in the coil 76.

It will be noted that the external voltage across the terminals 69 and 70 will be added to the rectified voltage fed to the Geiger-Müller tube 21. This is of advantage in obviating the necessity of having the oscillatory circuit alone produce a high enough voltage to operate the counter tube.

Figure 5:
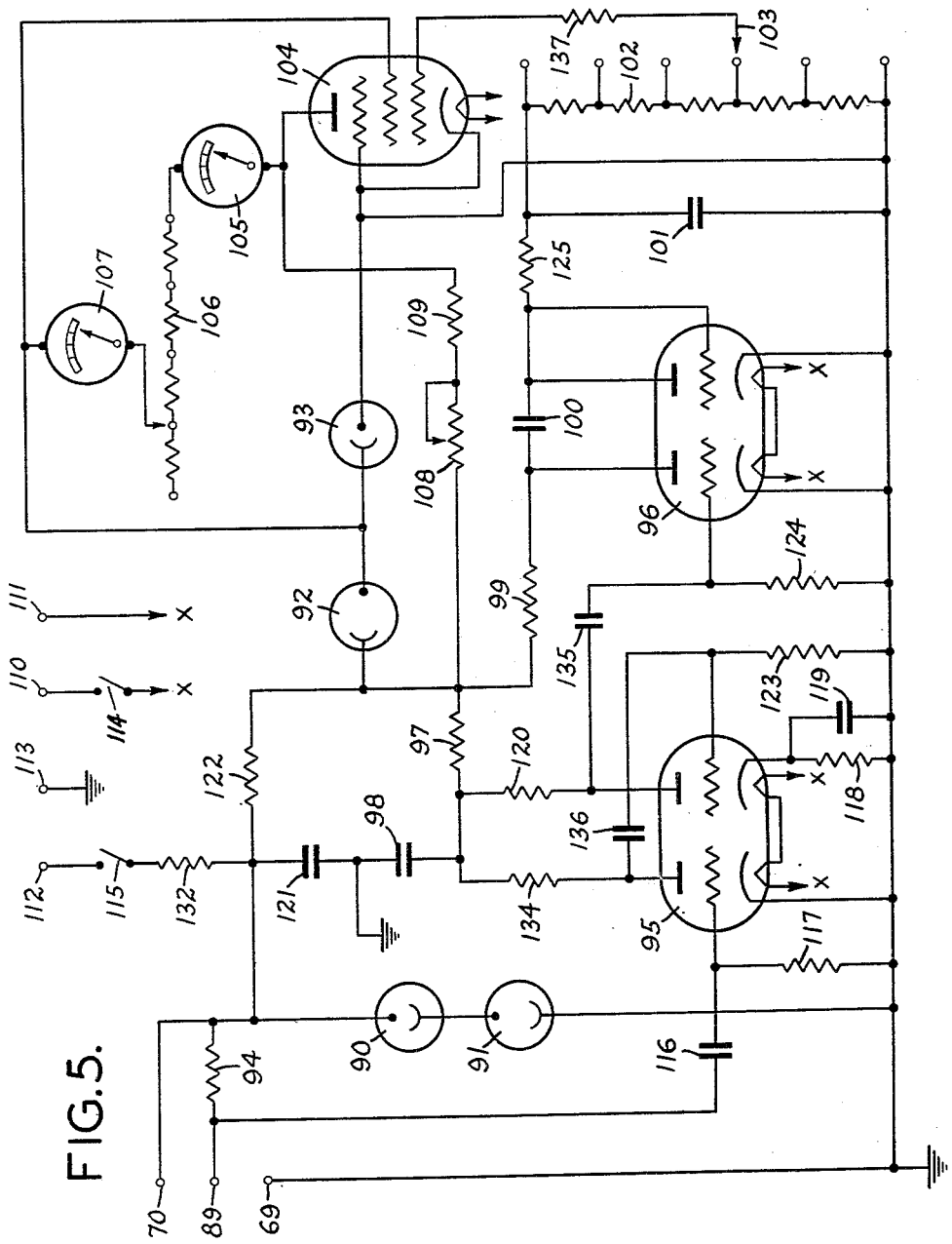
Fig. 5 shows the wiring diagram of that portion of the apparatus at the surface of the earth.

Fig. 5 shows the portions of the apparatus which are preferably kept above ground. Here the terminals which are connected below ground are numbered in the same fashion. It will be seen that the input of this apparatus, which is the output of the apparatus below ground is represented by 89. The amplified pulse is, therefore, applied across resistor 94 between terminals 70 and 89. Amplification is performed by resistance capacity coupled amplifier tube 95 and one section of tube 96. Amplification by tube 95 may be omitted, particularly if "cable" noises or other disturbances are troublesome. The resistor 97 and condenser 98 act as a plate supply filter for the amplifier tube 95 and prevent self-oscillation through plate coupling.

The tube 96 may be overloaded or operated at a suitable portion of its characteristic such that all pulses resulting therefrom will be of equal magnitude no matter what the size of the pulse originally fed to the apparatus. This is desirable since the number of pulses is the criterion of importance in a counter of this type.

Alternatively, where the output of the radioactive sensitive member is proportional to radioactivity, the tube 96 will be operated at that portion of its characteristic which will give a value proportional to the input. Thus, if a "proportional" counter is used, or one in which the size of the pulse is dependent on the radioactive intensity, the tube 96 can be operated at the approximately linear part of its characteristic so as to give an output proportional to the size of the input pulse.

The pulses resulting from amplification by tube 96, either levelled or not as indicated above, are applied through condenser 100, across the right-hand section of the same tube, operating as a diode rectifier. This rectifier charges condenser 100, which further charges condenser 101, through resistor 125. The voltage across condenser 101 is, therefore, proportional to the frequency of the pulses originally produced by the Geiger-Müller tube. This voltage is applied across a "step ladder attenuator" 102, with a switch 103 to select a suitable tap thereof. The voltage output of the attenuator is applied across tube 104, which has a milliammeter 105 in its plate circuit. The plate current will be proportional to the grid voltage, and, therefore, will also be proportional to the number of pulses. The meter 105 will, therefore, read the integrated average of the pulses produced by the Geiger-Müller counter.

In series with meter 105 is an adjustable resistance 106, which is connected in series with an external meter 107. The external meter may be a recording type while the meter 105 is an ordinary indicator type. The instrument will, therefore, indicate and record simultaneously. The two meters may be placed at different localities. Alternatively, meter 107 may be replaced by any current sensitive or current responsive device. The attenuator 102 acts as a range device. Since any proportion of the voltage appearing between the output terminals of the attenuator may be applied across the vacuum tube 104, the range of the apparatus may be changed as desired.

The input high direct current voltage is applied to terminals 112 and 113 and is controlled by the switch 115. A resistor 132 enables voltage from 112 and 113 to be stabilized by tubes 90 and 91 for application across terminals 69 and 70. The voltage regulators 92 and 93 which are gas discharge tubes connected in series, serve to supply accurate grid and plate voltages for the various tubes so as to assure accurate and stable operation thereof. The gas discharge voltage regulator tubes 90 and 91 serve to supply a constant direct current voltage to be fed through terminals 69 and 70 to the apparatus below ground. Alternatively, the voltage regulator tubes 90 and 91 may be mounted in the cartridge 4. In order to set the meters 105 and 107 to zero, a bucking circuit comprised by resistors 108 and 109 is provided. Adjustable resistor 108 is used as the zero setting resistor.

The filament voltage for the tubes which are operated at the surface of the ground, is supplied preferably by a six volt or other suitable voltage supply operated by switch 114, and furnished through supply terminals 110 and 111.

Because of the high temperatures often met with in deep bore holes, it will be found necessary when transformers or other similar electrical elements are utilized, to have these units provided with an insulating varnish capable of withstanding the temperatures encountered. The same remark applies to the resistors and condensers. If temperature compensation appears to be necessary or desirable, any of the means disclosed in our copending application Serial No. 203,814, filed January 2, 1951, for "Temperature Compensated Bore Hole Radioactivity Apparatus" may be employed for this purpose.

It will be noted that a relatively high frequency is utilized for the oscillating system in Fig. 4. There are several reasons for this. For one, the transformer is thus made very small and simple. Further, the filter system may also be made small and simple. If alternating currents of relatively low frequency were fed into the cartridge, it would be necessary to provide a large and bulky filter circuit to filter the ripple thereof. In certain cases, a high enough value for direct current voltage may be fed directly into the cartridge to operate the Geiger-Müller tube without the intermediacy of an oscillator and rectifier circuit. In most cases this will be undesirable, since the high voltage usually necessary may cause serious leakage in the cables and may cause erratic behaviour of the Geiger-Müller tube. It will be noticed that a series of gas discharge lamps 134 has been shown across the output of the oscillator. This serves to regulate the voltage applied to the counter tubes and to secure the accurate and dependable operation thereof. In some cases, the use of this voltage regulator will be found unnecessary. Where the oscillator system is particularly stable or the Geiger-Müller counter has a particularly long plateau, the voltage regulator system may not be necessary. The plateau of a Geiger-Müller counter is that portion of the characteristic curve of the counter for which a relatively large change of applied voltage will cause no change or a small change of the number of counts produced by the counter. Where the oscillator is omitted from the cartridge and the high voltage sent directly from the surface, it is highly desirable to have the voltage regulator system inside the cartridge, since the input voltage may be affected by erratic leakage of the cable.

Various elements in the different circuits have been shown without a description being given of their exact function. The function of these elements may be told from their relative positions in the respective circuits by those versed in the art.

A representative set of values which has been found to give good results is as follows:

| | |
|---|---|
| 82, .01 mfd. | 117, ¼ meg. |
| 81, $10^8$ ohm | 72, 1 LB 4 |
| 134, T–2 neon lamps | 95, 7F7 |
| 83, $10^9$ ohm | 132, 250 ohm |
| 84, .000075 mfd. | 121, 20 mfd. |
| 71a, 4000 ohm | 98, 5 mfd. |
| 75, High voltage rectifier. | 134, 0.1 meg. |
| 85, $10^8$ ohm | 136, .000075 mfd. |
| 74, 1 LN 5 | 120, 0.1 meg. |
| 126, .0001 mfd. | 118, 3,000 ohm |
| 127, 5 meg. | 119, 20 mfd. |
| 86, 1 meg. | 123, ¼ meg. |
| 87, .000075 mfd. | 124, ¼ meg. |
| 88, 1 meg. | 122, 1,000 ohm |
| 73, 1 LB 4 | 97, 50,000 ohm |
| 130, .001 mfd. | 96, 7F7 |
| 131, .0006 mfd. | 99, 75,000 ohm |
| 78, High frequency dust core transformer | 100, .0005 mfd. |
| | 92, VR–75 |
| 79, 3–15 mfd. | 93, VR–105 |
| 80, .01 mfd. | 108, 5,000 ohm |
| 129, 5 meg. | 109, 10,000 ohm |
| 133, .01 mfd. | 125, 20 meg. |
| 71, 1,250 ohm | 101, 1 mfd. |
| 94, 10,000 ohm | 104, 7C7 |
| 90, VR–150 | 105, 0–5 milliampere range |
| 91, VR–105 | 135, .000075 mfd. |
| 116, .0001 mfd. | 137, 50 meg. |

In the various modifications shown in Figs. 4 and 5 use has been made of pulses which are amplified and fed to the surface of the ground. These pulses are integrated at the surface of the ground, or in other words, are made to deliver a direct current whose value is proportional to the number of counts produced per unit time. It will be appreciated that if the output tube 73 of Fig. 4 is overloaded, all of the output pulses will be of equal size, regardless of the value of the input pulses. This being the case, the average current in the plate circuit of tube 73 will be proportional to the number of pulses. Therefore, by measuring the direct current across the output terminals, a measure will be had of the number of pulses per unit time.

While the specific embodiment has been drawn chiefly to a Geiger-Müller system, it will be understood that most of the members can be applied to other systems such as those utilizing ionization chambers. Thus, the high voltage may be applied in the same way. The transmitting circuits and the association of the circuit elements may also be utilized in ionization chamber assemblages.

The scope of the invention is indicated by the appended claims.

We claim:

1. Apparatus for investigating radioactivity in a bore hole, comprising a cartridge adapted to be disposed in a well, radioactivity sensitive means in the cartridge adapted to provide an electrical output that is a function of radioactivity in the vicinity thereof, electronic amplifier means in the cartridge including at least one class C amplifier stage constructed so as to amplify desired signals in the electrical output of said sensitive means while suppressing undesired signals, means for limiting the pulses in the output of said class C amplifier stage to a predetermined value, electrical rectifying and filtering means at the surface of the earth, electrical transmission means including said limiting means for transmitting the signal output of said amplifier means in the cartridge to said rectifying and filtering means, and means for exhibiting a function of the output of said rectifying and filtering means.

2. Apparatus for investigating radioactivity in a bore hole, comprising a cartridge adapted to be disposed in a well, a Geiger-Müller tube in the cartridge including anode means in an envelope and cathode means, means for maintaining a relatively large potential difference between the anode means and the cathode means of said tube as required for operation of said tube as a proportional counter, an impedance connected in the anode-cathode circuit of said tube, electrical means for inverting voltage pulses developed across said impedance in operation of said Geiger-Müller tube, class C operated amplifier means in said cartridge and connected to receive the output of said inverting means, said class C amplifier means being constructed so as to amplify desired signals in the output of said voltage inverting means while suppressing undesired signals, and means for exhibiting a function of the signal output of said amplifier means.

3. Apparatus for investigating radioactivity in a bore hole, comprising a cartridge adapted to be disposed in a well, a Geiger-Müller tube in the cartridge including anode means in an envelope and cathode means, means for maintaining a relatively large potential difference between the anode means and the cathode means of said tube as required for operation of said tube as a proportional counter, an impedance connected in the anode-cathode circuit of said tube, electron tube means for inverting voltage pulses developed across said impedance in operation of said tube, class C operated amplifier means in said cartridge and connected to receive the output of said inverting means, said class C amplifier means being constructed so as to amplify desired signals in the output of said inverting means while suppressing undesired signals, means for limiting the amplitudes of the pulses in the output of said class C amplifier means, rectifier means at the surface of the earth, electrical transmission means including said limiting means for transmitting the signal output of said amplifier means in the cartridge to said rectifier means, means for smoothing the output of said rectifier means, and means for exhibiting a function of the output of said smoothing means.

4. Apparatus for investigating radioactivity in a bore hole, comprising a cartridge adapted to be lowered into a well, a radioactivity sensitive device in said cartridge adapted to provide an electrical response that is a function of radioactivity in the vicinity thereof, electrical power supply means in the cartridge for supplying electrical energy to said sensitive device, amplifier means in the cartridge connected to receive the output of said sensitive device and including at least one class C operated stage constructed so as to amplify desired signals in the output of said radioactivity sensitive device while suppressing undesired signals, means for limiting the magnitudes of the pulses in the output of said class C stage to a predetermined value, a source of electrical energy at the surface, electrical transmission means for supplying electrical energy from said source at the surface to said power supply means and to said amplifier means in the cartridge to energize the same, electrical indicating means at the surface, and electrical transmission means including said limiting means for transmitting the signal output of said amplifier means in the cartridge to said electrical indicating means.

5. Apparatus for investigating radioactivity in a bore hole, comprising a cartridge adapted to be lowered into a well, a radioactivity sensitive device in said cartridge adapted to provide an electrical response that is a function of radioactivity in the vicinity thereof, electrical power supply means in the cartridge for supplying electrical energy to said sensitive device, amplifier means in the cartridge connected to receive the output of said sensitive device and including at least one class C operated stage constructed so as to amplify desired signals in the output of said sensitive device while suppressing undesired signals, means for limiting the magnitudes of the pulses in the output of said class C stage to a predetermined value, a source of electrical energy at the surface, electrical transmission means for supplying electrical energy from said source at the surface to said power supply means and to said amplifier means in the cartridge to energize the same, electron amplifier means at the surface of the earth, electrical transmission means including said limiting means for transmitting the signal output of said amplifier means in the cartridge to said amplifier means at the surface, means for rectifying the output of said amplifier means at the surface, means for smoothing the output of said rectifier means, and means for exhibiting a function of the output of said smoothing means.

6. Apparatus for investigating radioactivity in a bore hole, comprising a cartridge adapted to be lowered into a bore hole, a Geiger-Müller tube in the cartridge including an envelope having anode means therein and cathode means, power supply means in the cartridge for maintaining a relatively large potential difference between the anode means and cathode means of said tube as required for operation of said tube as a proportional counter, a high resistance connected in the anode-cathode circuit of said tube, electron tube means in the cartridge for inverting pulses developed across said resistance in operation of said tube, class C operated amplifier means in the cartridge and connected to receive the output of said inverting means, said class C amplifier means being constructed so as to amplify desired signals in the output of said inverting means while suppressing undesired signals, a source of electrical energy at the surface of the earth, electrical transmission means for supplying electrical energy from said source at the surface to said power supply means, inverting means and amplifier means in the cartridge to energize the same, electron amplifier means at the surface of the earth, electrical transmission means for transmitting the signal output of said amplifier means in the cartridge to said amplifier means at the surface, electrical means for rectifying the output of said amplifier means at the surface, electrical means for smoothing the output of said rectifying means, and means for providing indications of the output of said smoothing means.

References Cited in the file of this patent

UNITED STATES PATENTS

| | | |
|---|---|---|
| 2,133,776 | Bender | Oct. 18, 1938 |
| 2,167,630 | Bazzoni et al. | Aug. 1, 1939 |
| 2,197,453 | Hassler | Apr. 16, 1940 |
| 2,321,295 | Howell | June 8, 1943 |
| 2,434,297 | Test et al. | Jan. 13, 1948 |

OTHER REFERENCES

Rev. of Sci. Inst., vol. 7, Dec. 1936, pages 450–455.
Rev. of Sci. Inst., vol. 10, Nov. 1939, pages 332–336.